United States Patent
Kaiser et al.

(10) Patent No.: US 6,201,050 B1
(45) Date of Patent: Mar. 13, 2001

(54) BREAKABLE GEL ADDITIVE CARRIER FOR IONIC COMPOSITIONS

(76) Inventors: Conrad E. Kaiser; Jock R. Collins; James R. Collins, all of 5817 Centralcrest, Houston, TX (US) 77092

( * ) Notice: Subject to any disclaimer, the term of this patent is extended or adjusted under 35 U.S.C. 154(b) by 0 days.

(21) Appl. No.: 09/307,502

(22) Filed: May 7, 1999

Related U.S. Application Data

(60) Provisional application No. 60/084,804, filed on May 7, 1998.

(51) Int. Cl.$^7$ ............................... C08K 5/16; C08K 5/17; C08L 33/02

(52) U.S. Cl. .......................... 524/239; 524/249; 524/247; 524/556; 106/505; 106/823

(58) Field of Search ............................. 526/556; 524/247, 524/249, 239; 106/505, 823

(56) References Cited

FOREIGN PATENT DOCUMENTS 58-017157 * 2/1983 (JP) ..................................... 524/239

* cited by examiner

*Primary Examiner*—David W. Wu
*Assistant Examiner*—Kelechi C. Egwim
(74) *Attorney, Agent, or Firm*—Kenneth A. Robby

(57) ABSTRACT

A viscous breakable gel additive carrier for mixing with ion containing materials, including dry powder based and calciferous materials, which in its uniform homogeneous gel form, prevents separation and settling of the additives prior to mixing and is easily measurable, and upon mixing with the ion containing materials liquefies and becomes totally and evenly miscible to allow easy and precise mixing to produce uniform homogeneous mortars, grouts, stuccos and other compositions. The gel includes a predetermined amount of selected additives thoroughly mixed with a cross-linked polyacrylic acid gelling agent, an organic chelating agent, and an alkaline electrolyte, and prior to mixing with ion containing materials, has a consistency of a custard or jelly.

28 Claims, No Drawings

BREAKABLE GEL ADDITIVE CARRIER FOR IONIC COMPOSITIONS

CROSS REFERENCE TO RELATED APPLICATION

This application claims priority of provisional patent application Ser. No. 60/084,804, filed May 7, 1998.

BACKGROUND OF THE INVENTION

1. Field of the Invention

This invention relates generally to additive carriers for mixing with compositions such as mortar, grout, stucco and other materials, and more particularly to a viscous breakable gel additive carrier for mixing with ion containing materials which, in its gel form, prevents separation and settling of the additives prior to mixing and is easily measurable, and upon mixing with the ion containing materials liquefies and becomes totally and evenly miscible to allow easy and precise mixing to produce uniform homogeneous mortars, grouts, stuccos and other compositions.

2. Brief Description of the Prior Art

Mortars, grouts, stuccos, and similar materials have long been known. In Central America the Maya used pigmented stucco to decorate their temples and pyramids centuries ago. Most commonly, a dry powder consisting of Portland-type cements, fine silica, pigments and hardening agents mixed with water are used to produce these materials. Although the dry additives will not settle from the dry base materials, precise and even distribution in the finished product is difficult to achieve. Prior art methods of mixing "dry additive" materials on the job results in the loss of much time, labor, and material due to the difficulty of obtaining uniform distribution of the additives and/or pigmentation throughout the material to be used. On small jobs, it is common to waste of the majority of the dry ingredients because the remaining partial sack contents will hydrate and form lumps thereby becoming unusable when stored in containers that have been opened or broken open.

More recently, methods have been developed that utilize suspension enhancing agents to carry additives and pigments in water, and then the aqueous composition is added to the powdered dry base. Failure is often common even with these methods, because the additives have settled out of their liquid carriers in the storage containers. Also, often prior to use, workmen at the job site do not shake, stir, or properly mix the additives that have settled out of the liquid suspension. The resulting material may show shade differences due to uneven mixing of pigments because the first portion of the aqueous carrier taken from the top of the container's contents may contain little pigment and the pigment concentrations increase as the bottom of the source container is approached. Another problem that can occur with uneven mixing of the additives is that it can produce varying strength of materials. This problem may not be seen immediately but may soon result in a physical breakdown of the finished product.

Others have patented methods and compositions for use with mortars, grouts, stuccos, plasters, adhesives, and other products, and to overcome such problems as adhesion, installation qualities, freeze-thaw resistance, decreasing weight, acoustical qualities, texturing, multiple colors, etc. However, most workmanship claims in the industry are due to uneven coloring of applied cementitious mortar or other finish, which is usually caused by uneven distribution, and availability of the pigments prior to application. Additionally, workmanship claims are common because of the problem of mortar strength failure due to uneven mixing and distribution of other additives.

Making additives uniformly available when hydrating ion containing materials such as Portland-type cements and other calciferous products has long been a problem. It is well known that dry blenders build up static charges that can cause some polar additives to agglomerate and thereby lose their ability to attain uniform distribution. Some mineral pigments are particularly charge sensitive with resultant streaking of colors and severe shading causing job failure. The breakable gel additive carrier in accordance with the present invention overcomes charge sensitivity.

Some additives such as hydroxymethylcellulose and hydroxyethylcellulose, to name only two, absorb water needed for hydration, then release it slowly. This allows the materials compounded therewith to cure uniformly when used in conjunction with a substrate with high absorption capacity that would otherwise rapidly extract the water. If extreme care is not taken in the formulation process a cement matrix can suffer excessive retardation of "set" due to its inability to extract the water needed for hydration from the cellulose. It is vital to choose the correct type, viscosity, and amount of cellulose material. Failure can still occur unless it is distributed evenly in the end product. The breakable gel additive carrier in accordance with the present invention imparts homogeneous distribution.

Agents used for suspending additives serve no purpose other than to prevent the desired additives from separating out of the aqueous phase prior to mixing with ion containing materials such as cementitious powders. Because of the inefficiency of most such suspension agents, they must be used in significant quantities. Any material other than water, when added to dry cementitious materials will compromise the strength of the end product produced. Limiting the quantity of additives therefore is imperative unless the additives serve a useful purpose. Pigments, cellulose derivatives, latex, and similar materials have specific uses. Clays, starches, gums, protein, animal glues, and other materials have no purpose other than suspension agents and therefore should be avoided if possible. The breakable gel additive carrier in accordance with the present invention prevents the additives from separating prior to mixing with ion containing materials.

Water availability to the hydrating Portland-type cements is critical because it largely determines the ultimate strength of the "set" cement matrix. Portland-type cements will normally utilize up to 30% of their own dry powder weight in the hydrating process. Changes in water availability by additives whose sole function is to increase stability of the aqueous composition prior to addition to the cementitious base will compromise the coloration and strength of cement based compositions. Without competition from unnecessary suspension enhancing agents, cellulose derivatives are more efficiently hydrated and assimilated, therefore greatly decreasing the quantities required. Current methods require 0.5% to 10% suspension enhancing agents, whereas the breakable gel additive carrier in accordance with the present invention provides flawless additive carrying capacity with less than 0.02% suspension enhancing agents.

Colorant (pigment) addition to Portland-type cements utilizing aqueous carriers also presents specific problems. The cement to water ratio is important for proper hydration and to prevent shading from batch to batch. It is customary, and usually necessary, that more than one batch must be mixed by the end user to complete large areas. If, on the second and subsequent batches, the mixing water is increased or decreased by even small percentages, the entire job could be rejected. The breakable gel additive carrier in accordance with the present invention, without masking by unnecessary suspension enhancing agents, requires less pigment while still resulting in brighter and more saturated coloration of the composition.

Most chemical additives, especially pigments, will separate and sink to the bottom of the container, even when suspension enhancement agents are used. This makes them difficult or impossible to again evenly and homogeneously disperse and use especially in large containers. The breakable gel additive carrier in accordance with the present invention overcomes these and other problems in its ability to "pre-wet" or "pre-mix" the additives in the proper amount of water normally used in the hydration process.

There are several commercially available products and patents directed toward various compositions for mixing with ion containing materials such as dry powder based cementitious materials, mortars, grouts, stuccos, etc.

Dryvit Systems, Inc. of West Warwick, R.I., a division of RPM, Inc. of Medina, Ohio, one of the world's largest manufacturers of cementitious products for interior and exterior use, has been adding pigments and other additives to the aqueous portion of their products since the 1960s as part of their effort to solve the problems encountered with uneven mixing of additives. Their biggest problems continue to be streaking and shading of their applied finished products. This is directly related to the difficulty of obtaining an even mix even though they have been adding pigments and additives to the aqueous portion of their mix for many years. Dryvit now allows their end users to mix additives/pigments at the job site because they have found no method to keep them homogeneously suspended in their products if mixed at the factory.

Bowden, U.S. Pat. No. 4,204,876 discloses a method of using thixotrophic compositions to carry additives in the liquid portion of cementitious products as a method of attempting to gain homogeneity of the end product.

Johansen et al, U.S. Pat. No. 5,558,708 discloses a "two-component" system and method for dispensing pigment in cement based composition using a predetermined and prepackaged amount of an aqueous liquid pigment carrier component that is mixed with a predetermined and prepackaged amount of a powder cement component to obtain standardized colors. Although this system has merit it does not solve the problem of color and additive variance within batches because the pigments and additives commonly, and usually very rapidly, settle out of the liquid leaving a virtually clear liquid at the top and a concentration of additives and pigments at the bottom of the container. Vigorous stirring, shaking, or otherwise mixing of the pigment carrier component after storage and prior to combining with the powdered materials is required. Relatively large quantities of suspension enhancing agents are required that serve no other purpose. These agents mask, dilute, change, or otherwise compromise the final composition. Additionally, products with large quantities of suspending agents must be sold in small containers to facilitate shaking by the end user.

Johansen et al, U.S. Pat. No. 5,846,315 disclose a method for preparing a pigment dispersing pigment cement composition comprising water, pigment, a suspension enhancing agent and latex polymer solids. Two or more prepackaged compositions of an aqueous liquid pigment component is mixed with a prepackaged amount of a dry powder cement component to obtain cement composition with a uniform and standardized color. The suspension control agents, viscosity control agents, etc., two or more of which are required, are thoroughly mixed together prior to combining with the prepackaged dry powder cement. Agents that merely increase the viscosity of the aqueous component sufficient to carry the desired additives preclude its use in acting as a source of water in calciferous materials.

Johansen et al, U.S. Pat. No. 5,855,665 disclose a system and method for producing a pigmented cement compositions that uses significant percentages of only marginally effective suspension enhancing agents. Vigorous shaking, stirring, or otherwise mixing is still required which also limits container size to that which can be conveniently handled by workmen. Furthermore, the significant concentrations of suspension enhancing agents and dispersants required in the aqueous coloring composition can be deleterious to the makeup and strength of the end product. Additionally, the setting aids required are essential because the products also contain chemicals that compromise setting. These materials can also be detrimental to the ultimate strength of the final mix. This system also requires the mixing of additional water into the prepackaged pigmented cement compositions.

The present invention is distinguished over the prior art in general, and these patents in particular by a viscous breakable gel additive carrier for mixing with ion containing materials, including dry powder based and calciferous materials, which in its uniform homogeneous gel form, prevents separation and settling of the additives prior to mixing and is easily measurable, and upon mixing with the ion containing materials liquefies and becomes totally and evenly miscible to allow easy and precise mixing to produce uniform homogeneous mortars, grouts, stuccos and other compositions. The gel includes a predetermined amount of selected additives thoroughly mixed with a cross-linked polyacrylic acid gelling agent, an organic chelating agent, and an alkaline electrolyte, and prior to mixing with ion containing materials, has the consistency of a custard or jelly.

SUMMARY OF THE INVENTION

It is therefore an object of the present invention to provide a breakable gel additive carrier for mixing with ion containing materials, including dry powder based and calciferous materials, which, in its gel form, prevents separation and settling of pigments and other non-soluble chemical additives prior to mixing and is easily measurable, and upon mixing with the ion containing materials liquefies and becomes totally and evenly miscible to allow easy and precise mixing to produce uniform homogeneous mortars, grouts, stuccos and other compositions.

It is another object of this invention to provide a homogeneous breakable gel additive carrier for mixing with ion containing materials, such as dry powder based and calciferous materials, which will liquefy upon mixing with the materials to serve as the source of all liquids required, along with desired additives, in the production of cement based mortars, grouts, stuccos and other compositions blended to industry standards.

Another object of this invention is to provide a breakable gel additive carrier for mixing with ion containing materials which is easily measured and mixed with a variety of locally supplied powdered base materials.

Another object of this invention is to provide a breakable gel additive carrier which gives distributors and end users wider range of additives and colors than to date have been available because of the previous inability to evenly distribute and stabilize these materials in powders and liquids.

Another object of this invention is to provide a breakable gel additive carrier which contains evenly distributed and stabilized pigments and other non-soluble chemical additives that will produce uniform coloration in finished dry powder based and liquid products, and the resultant color is consistent and reproducible.

Another object of this invention is to provide a breakable gel additive carrier which allows the use of pigments and additives that need not necessarily be finely ground because the breakable gel prevents their settling.

Another object of this invention is to provide a breakable gel additive carrier that does not contain excessive suspension enhancing agents that will mask or compromise the effects of pigments and therefore allows the use of smaller quantities of pigments and other useful additives.

Another object of this invention is to provide a breakable gel additive carrier which can be stored and shipped in large volume containers because it does not require shaking, stirring, agitation, nor having the contents otherwise mixed prior to use.

Another object of this invention is to provide a breakable gel additive carrier that does not require further additions of any liquids when mixing with dry powder materials.

A further object of this invention is to provide a breakable gel additive carrier that liquefies upon mixing with ion containing materials and does not contain clays or other suspension enhancing agent additives and thereby increases the water availability for the setting of cementitious materials.

A still further object of this invention is to provide a breakable gel additive carrier which will increase the smoothness and workability of cementitious products sufficient to allow tile to be laid from a top level line down without tile slippage.

Other objects of the invention will become apparent from time to time throughout the specification and claims as hereinafter related.

The above noted objects and other objects of the invention are accomplished by a viscous breakable gel additive carrier for mixing with ion containing materials, including dry powder based and calciferous materials, which in its uniform homogeneous gel form, prevents separation and settling of the additives prior to mixing and is easily measurable, and upon mixing with the ion containing materials liquefies and becomes totally and evenly miscible to allow easy and precise mixing to produce uniform homogeneous mortars, grouts, stuccos and other compositions. The gel includes a predetermined amount of selected additives thoroughly mixed with a cross-linked polyacrylic gelling agent, an organic chelating agent, and an alkaline electrolyte, and prior to mixing with ion containing materials has the consistency of a custard or jelly.

DESCRIPTION OF THE PREFERRED EMBODIMENT

The present invention overcomes the problems of even mixing of pigments and other non-soluble chemical additives with ion containing materials, including dry powder based and calciferous materials, by utilizing a breakable gel additive carrier which, in its gel form, prevents separation and settling of the additives prior to mixing, and upon mixing with the ion containing materials liquefies and becomes totally and evenly miscible to allow easy and precise mixing to produce uniform homogeneous mortars, grouts, stuccos and other compositions.

The breakable gel additive carriers are compounded to contain the desired property enhancing additives and/or pigments for a particular use, as described in the examples below. First the additives and/or pigments are mixed with water and completely disperse them therein, and then a gelling agent base, such as a cross-linked polyacrylic acid is mixed in (may range from about 0.000034% to about 0.009% by weight). The cross-linked polyacrylic acid, when mixed with the water, significantly lowers the pH of the water. Then an organic chelating agent, such as ethylenediaminetetraacetic acid is added to this mixture (may range from about 0.0001% to about 0.001%, by weight). When the chelating agent is added, it binds excess ions that may be present in the water or in the other additives. The mixture at this point is in a free-flowing liquid state of a water consistency and allows complete and even mixing and dispersal of the additives and/or pigments. After the additives have been thoroughly mixed, an alkaline electrolyte, such as an ethanolamine or a triethanolamine, is added (may range from about 0.001% to about 0.009%, by weight) to raise the pH and produce a smooth uniform homogeneous gel having the consistency of a custard or jelly. The viscosity level of the finished gel may range from about 4,000 to about 200,000 centipoise (typically from about 12,500 to about 200,000 centipoise).

When the breakable gel additive carrier is subsequently mixed with any ion containing material, such as Portland-type cement powder based materials and materials having polyvalent cations, it reverts almost instantly to a liquid upon contact during the mixing process.

When the ion contain material, such as Portland-type cement base powders and materials having polyvalent cations, are mixed with the breakable gel additive carrier containing the desired additives and pigments, the electrolytes break the long cross linked polyacrylic acid—triethanolamine chains because the polyacrylic acid has more affinity for simple ions than for triethanolamine. Thus, the long organic chains that makeup the support to form the gel are broken resulting in its liquification.

The broken gel then has the consistency of water with the desired additives and/or pigments evenly distributed therein. The additives and pigments cannot settle out of the carrier in its gel state, yet after the gel breaks following the addition of the ion containing material, uniform mixing of these property enhancing ingredients with the base powder or ion-containing materials is easy and a homogeneous standardized end product is assured.

The following examples describe various formulations of the breakable gels compounded to contain additives for particular uses. These examples are provided for illustrative purposes only and should not be construed as limiting the scope of the invention. Many variations and applications, which do not depart from the scope and spirit of the present invention, will be apparent to those skilled in the art. All such modifications are within the intended scope of this invention.

GROUT GEL PREPARATION

EXAMPLE 1 of Pigmented Grout Gel

To produce a "Dusty Rose" pigmented grout gel, to 3000 gm water, with continuous mixing, add 30 gm of a powdered vinyl acrylic latex, such as Air Products Corp. Airflex RP-245 and then 103.6 gm of a red pigment such as Pfizer R-3098 red pigment and 204.7 gm of a blue pigment such as WC&D 50250 blue pigment. Continue mixing until all pigments are thoroughly dispersed and then, with continued mixing, add 10 gm of cross linked polyacrylic acid. To this mixture add 1.5 gm of ethylenediaminetetraacetic acid with continued mixing. If the water is very hard, e.g. it contains large amounts of calcium, additional ethylenediaminetetraacetic acid may be require to obtain proper gelling. After the mixture is completely homogeneous, with continued mixing add 18 gm of triethanolamine or sufficient quantity to raise the pH enough to produce a smooth gel with the consistency of custard or jelly. The procedure will produce a breakable gel that, when mixed with a commercially available 40% white cement/60% sand mixture, will result in a "Dusty Rose" colored grout.

EXAMPLE 2 of Pigmented Grout Gel

To produce a "Canvas" pigmented grout gel to 3000 gm water, with continuous mixing, add 30 gm of a powdered vinyl acrylic latex such as Air Products Corp. Airflex RP-245 and then 46.8 gm of a yellow pigment such as Pfizer YO8087 yellow pigment, 4.7 gm of a black pigment such as Pfizer BK5099 black pigment, 1.8 gm of a brown pigment such as Pfizer B6997 brown pigment, and 0.6 gm of a burnt umber pigment such as Pfizer BU5250 burnt umber. Continue mixing until all pigments are thoroughly dispersed and then, with continued mixing, add 10 gm of a cross linked polyacrylic acid. To this mixture add 1.5 gm of ethylenediaminetetraacetic acid with continued mixing. If the water is very hard, e.g. it contains large amounts of calcium, additional ethylenediaminetetraacetic acid may be require to obtain proper gelling. After the mixture is completely homogeneous, with continued mixing add 18 gm of triethanolamine or sufficient quantity to raise the pH enough to produce a smooth gel with the consistency of custard or jelly. The procedure will produce a breakable gel that, when mixed with a commercially available 40% white cement/ 60% sand mixture, will result in a "Canvas" colored grout.

Adhesive Gel Preparation

Example of Adhesive Gel

To produce an adhesive gel preparation, to 3000 gm of water add 8 gm of a powdered vinyl acrylic latex such as Air Products Corp. Airflex RP-245 latex and with continuing mixing add 15 gm of an adhesive, preferably a cellulose derivative (hydroxmethylcellulose or hydroxyethylcellulose), such as Bermocol 351 to obtain a homogeneous mixture. Then 1.5 gm of ethylenediaminetetraacetic acid is added and mixed thoroughly. If the water is very hard, i.e., it contains significant amounts of calcium, addition ethylenediaminetetraacetic acid may be required to later obtain proper gelling. To this mixture add 3 gm of a biocide such as proxel GLX and then add 18 gm of triethanolamine or sufficient additional quantity to raise the pH enough to produce a smooth gel with the consistency of custard or jelly. This will produce a breakable adhesive gel that, when mixed with a commercially available non-sanded, or 40% cement/60% sand mixture with grain size of 60 to 100 mesh (U.S. or Tyler sieve screen size), will result in a workable tile adhesive.

Pigmented Grout Preparation

The pigmented grout gels are to be mixed with either white or gray cement or cement/sand to produce the color depicted in a color chart. In general the darker colors require gray cement or cement/sand whereas lighter colors require white cement or cement/sand. Each grout color on the color chart is numbered in combination with the letter "W" or "G" to indicate whether white or gray cement or cement/sand is to be used to produce the desired color.

EXAMPLE 1 Using Pigmented Gel

To produce sanded Dusty Rose pigmented grout, place a desired quantity of the Dusty Rose pigmented gel into a mixing container. Add a small quantity of a commercially available cement/sand mixture and begin mixing which will immediately break the gel into a free flowing pigmented liquid. Add sufficient additional cement/sand to produce a workable grout. Allow the grout to slake in the mixing container for 15 minutes and then use.

EXAMPLE 2 Using Pigmented Gel

To produce non-sanded Dusty Rose grout, place a desired quantity of the Dusty Rose pigmented gel into a mixing container. Add a small quantity of a commercially available 50% Portland cement and 50% calcium carbonate, or masonry cement, and begin mixing which will immediately break the gel into a free flowing pigmented liquid. Add sufficient cement to produce a workable grout. Allow the grout to slake in the mixing container for 15 minutes and then use.

EXAMPLE 3 Using Pigmented Gel

To produce sanded Canvas pigmented grout, place a desired quantity of the Canvas pigmented gel into a mixing container. Add a small quantity of a commercially available cement/sand mixture and begin mixing which will immediately break the gel into a free flowing pigmented liquid. Add sufficient additional cement/sand to produce a workable grout. Allow the grout to slake in the mixing container for 15 minutes and then use.

EXAMPLE 4 Using Pigmented Gel

To produce non-sanded Canvas pigmented grout, place a desired quantity of the Canvas pigmented gel into a mixing container. Add a small quantity of a commercially available 50% Portland cement and 50% calcium carbonate, or masonry cement, and begin mixing which will immediately break the gel into a free flowing pigmented liquid. Add sufficient cement to produce a workable grout. Allow the grout to slake in the mixing container for 15 minutes and then use.

The pigmented gels are preferably packaged in one-gallon containers to be used with 40 LB sacks of commercially available cement/sand to produce workable homogeneous pigmented grouts for vitreous and semi vitreous tile. For porous bodied wall tile such as used in bathrooms, one gallon of adhesive gel is used per 25 LBS of non-sanded cementitious powder, such as white or gray cementitious powder.

Adhesive Preparation Using Adhesive Gel

To produce a mastic adhesive, place a desired quantity of the adhesive gel into a mixing container. Add a small quantity of a commercially available 40% cement/60% sand, or pure Portland cement, and begin mixing which will immediately break the gel into a free flowing liquid. Add sufficient cement to produce a workable mastic. Allow the mastic to slake in the mixing container for 15 minutes and then use.

The adhesive gels are preferably packaged in one-gallon containers to be used with 40 LB sacks of commercially available cement/sand to produce workable homogeneous adhesives for all kinds of tile.

The breakable gel additive carrier will remain homogeneous and uniform in consistency and resists changes and microbial attack. Thus, the breakable gel additive carrier can be packaged in large volume containers and stored until ready for use because there is no separation or settling of the ingredients that would require shaking of the container or mixing of the contents, as is required with prior art watery aqueous additive carriers.

Also, unlike prior art watery aqueous additive carriers, the present breakable gel does not contain suspension enhancing agents or setting aids such as clays, etc., since they may inhibit gel formation and stability. As discussed above, significant concentrations of suspension enhancing agents and setting aids can be deleterious to the makeup and strength of the final mix and resultant end product.

The breakable gel additive carrier may be mixed with any existing Portland-type cement dry base powders, and the particle size of the ingredients in the dry components will depend on the desired end use. Providing the heavy base powders locally allow significant savings in transportation costs. In addition, distributors and end users enjoy significant inventory savings, since only two base colors of the powders (gray and white) must be stocked and can be used for all jobs regardless of color desired.

While this invention has been described fully and completely with special emphasis upon a preferred embodiment, it should be understood that within the scope of the appended claims, the invention may be practiced otherwise than as specifically described herein.

For example, the present breakable gel additive carrier may be mixed with other ion containing materials such as dry powder based materials, calciferous materials, mortars, grouts, stuccos, cementitious materials, Portland-type cements, hydrophilic materials, and ion containing liquid materials.

What is claimed is:

1. A viscous breakable gel additive carrier for mixing with ion containing materials, comprising:
   a homogeneous breakable gel having the consistency of a custard or jelly prior to mixing with ion containing materials and containing additives thoroughly mixed and suspended therein that are to be dispersed into the ion containing materials;
   said gel breaking upon mixing with ion containing materials to become a free flowing liquid to facilitate mixing, blending and homogeneous dispersal of said additives with said ion containing materials and thereby produce a uniform composition.

2. The viscous breakable gel additive carrier according to claim 1, wherein
   said homogeneous breakable gel has a viscosity level, prior to mixing with the ion containing materials, in the range of from about 4,000 to about 200,000 centipoise.

3. The viscous breakable gel additive carrier according to claim 1, wherein
   said homogeneous breakable gel has a viscosity level, prior to mixing with the ion containing materials, in the range of from about 12,500 to about 200,000 centipoise.

4. The viscous breakable gel additive carrier according to claim 1, wherein
   said breakable gel comprises a mixture of:
   water;
   at least one property enhancing additive that is to be dispersed into said ion containing materials in an amount sufficient to enhance the properties of said ion containing materials;
   a gelling agent base in an effective amount sufficient to lower the pH of said water and said additive;
   an organic chelating agent in an effective amount sufficient to bind excess ions in said water and said additive; and
   an alkaline electrolyte viscosity increasing agent in an effective amount sufficient to raise the pH and form the mixture into a gel with a viscosity level having the consistency of a custard or jelly.

5. The viscous breakable gel additive carrier according to claim 4, wherein
   said amount of said gelling agent base is from about 0.000034% to about 0.009% by weight.

6. The viscous breakable gel additive carrier according to claim 4, wherein
   said gelling agent base comprises a cross-linked polyacrylic acid.

7. The viscous breakable gel additive carrier according to claim 4, wherein
   said amount of said organic chelating agent is from about 0.0001% to about 0.001% by weight.

8. The viscous breakable gel additive carrier according to claim 4, wherein
   said organic chelating agent comprises ethylenediaminetetraacetic acid.

9. The viscous breakable gel additive carrier according to claim 4, wherein
   said amount of said alkaline electrolyte is from about 0.001% to about 0.009% by weight.

10. The viscous breakable gel additive carrier according to claim 4, wherein
    said alkaline electrolyte is selected from the group consisting of ethanolamines and triethanolamines.

11. The viscous breakable gel additive carrier according to claim 4, wherein
    said property enhancing additive is an adhesive to be evenly dispersed in said ion containing materials.

12. The viscous breakable gel additive carrier according to claim 4, wherein
    said property enhancing additive is a pigment to be evenly dispersed in said ion containing materials to produce a uniform color therein.

13. A method for the preparation of a viscous breakable gel additive carrier comprising the steps of:
    mixing at least one property enhancing additive that is to be dispersed into ion containing materials with water in a mixing container wherein said additive is in an amount sufficient to enhance the properties of said ion containing materials;
    mixing a gelling agent base with said water/additive mixture wherein the gelling agent comprises an effective amount sufficient to lower the pH of the water;
    mixing an organic chelating agent with the water/additive/gelling agent base mixture in an effective amount sufficient to bind excess ions in said water and said additive, said water/additive/gelling agent base mixture being in a free-flowing liquid state of a water consistency; and thereafter
    mixing an alkaline electrolyte viscosity increasing agent with the water/additive/gelling agent base/chelating agent mixture in an effective amount sufficient to raise the pH and form a gel with a viscosity level having the consistency of a custard or jelly;

said gel breaking upon mixing with ion containing materials to become a free flowing liquid to facilitate mixing, blending and homogeneous dispersal of said additives with said ion containing materials.

14. The method according to claim 13, wherein said alkaline electrolyte viscosity increasing agent is mixed with the water/additive/gelling agent base/chelating agent mixture in an effective amount sufficient to raise the pH and form a gel with a viscosity level in the range of from about 4,000 to about 200,000 centipoise.

15. The method according to claim 13, wherein said alkaline electrolyte viscosity increasing agent is mixed with the water/additive/gelling agent base/chelating agent mixture in an effective amount sufficient to raise the pH and form a gel with a viscosity level in the range of from about 12,500 to about 200,000 centipoise.

16. The method according to claim 13, wherein said amount of said gelling agent base is from about 0.000034% to about 0.009% by weight.

17. The method according to claim 13, wherein said gelling agent base comprises a cross-linked polyacrylic acid.

18. The method according to claim 13, wherein said amount of said organic chelating agent is from about 0.0001% to about 0.001% by weight.

19. The method according to claim 13, wherein said organic chelating agent comprises ethylenediaminetetraacetic acid.

20. The method according to claim 13, wherein said amount of said alkaline electrolyte is from about 0.001% to about 0.009% by weight.

21. The method according to claim 13, wherein said alkaline electrolyte is selected from the group consisting of ethanolamines and triethanolamines.

22. The method according to claim 13, wherein said property enhancing additive is an adhesive to be evenly dispersed in said ion containing materials.

23. The method according to claim 13, wherein said property enhancing additive is a pigment to be evenly dispersed in said ion containing materials to produce a uniform color therein.

24. A method for uniformly dispersing property enhancing additives into ion containing materials, comprising the steps of:

providing an ion containing material;

providing a homogeneous breakable gel having the consistency of a custard or jelly prior to mixing with said ion containing materials and containing additives thoroughly mixed and suspended therein that are to be dispersed into said ion containing materials; and mixing said ion containing material with said breakable gel; wherein said gel breaks upon mixing with said ion containing material to become a free flowing liquid to facilitate mixing, blending and uniform dispersal of said additives with said ion containing material and thereby produce a uniform composition.

25. The method according to claim 24, wherein said ion containing material is selected from the group consisting of dry powder based materials, calciferous materials, mortars, grouts, stuccos, cementitious materials, Portland-type cements, hydrophilic materials, and ion containing liquid materials.

26. The method according to claim 24, wherein said ion containing material is selected from the group consisting of dry powder based materials, calciferous materials, mortars, grouts, stuccos, cementitious materials, Portland-type cements, and hydrophilic materials; and said gel breaks upon mixing with said ion containing material to become a free flowing liquid wherein the liquid is in an effective amount sufficient to hydrate said ion containing materials.

27. The method according to claim 24, wherein said property enhancing additive is a pigment to be evenly dispersed in said ion containing materials to produce a uniform color therein.

28. The method according to claim 24, wherein said property enhancing additive is an adhesive to be evenly dispersed in said ion containing materials.

* * * * *